No. 778,226.

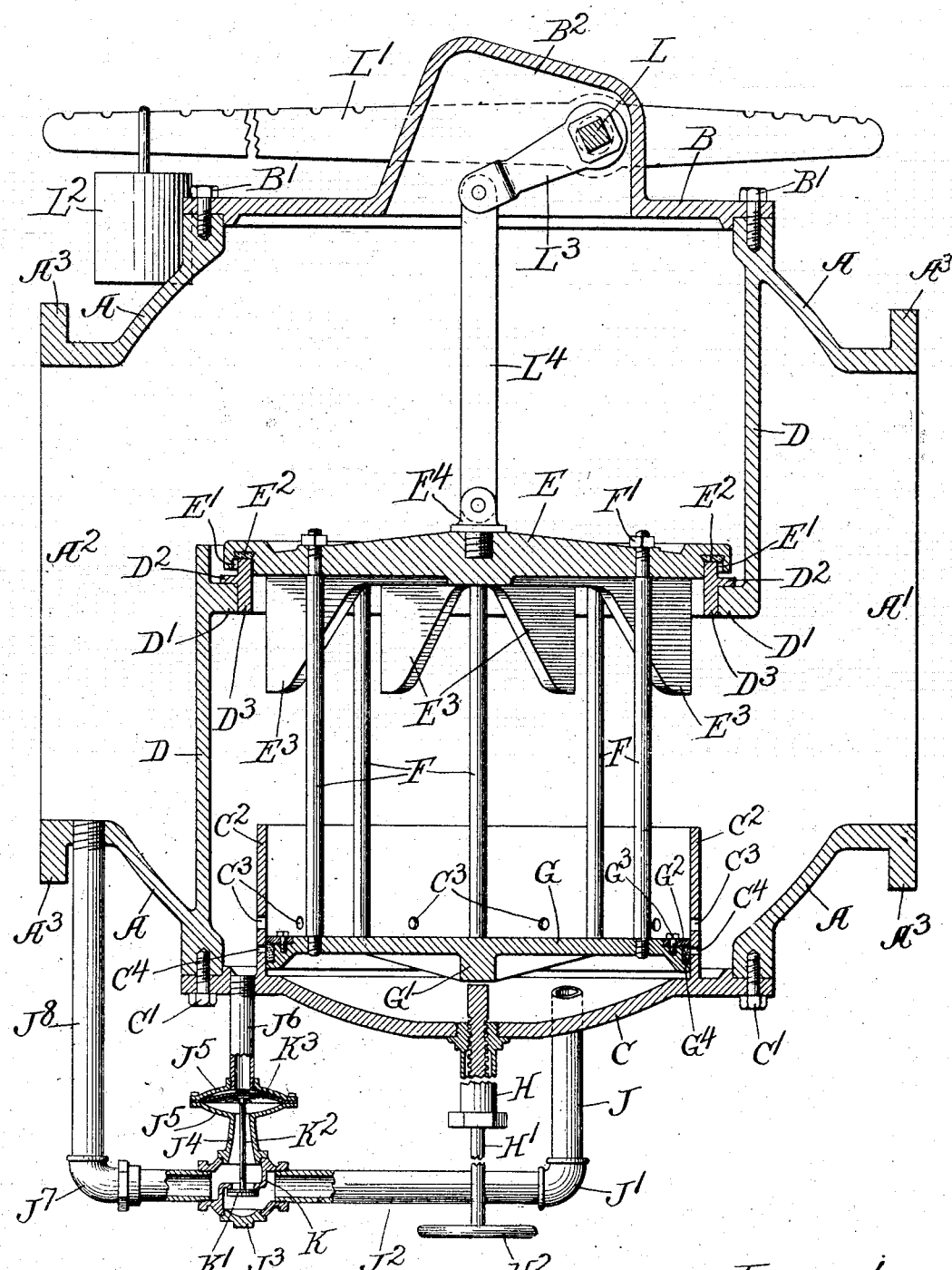

Patented December 27, 1904.

UNITED STATES PATENT OFFICE.

GEORGE C. DAVIS, OF CHICAGO, ILLINOIS.

RELIEF-VALVE.

SPECIFICATION forming part of Letters Patent No. 778,226, dated December 27, 1904.

Application filed March 17, 1904. Serial No. 198,583.

*To all whom it may concern:*

Be it known that I, GEORGE C. DAVIS, a citizen of the United States, residing at Chicago, in the county of Cook and State of Illinois, have invented a certain new and useful Improvement in Relief-Valves, of which the following is a specification.

My invention relates to relief-valves for engines, and has for its object to provide means for automatically counterbalancing the relief-valve.

The accompanying drawing shows a vertical sectional view of one form of my device.

My valve is particularly adapted to be used upon steam turbine-engines which operate in a vacuum caused by the condensation of steam in the condenser or in any other preferred way, the valve being designed to automatically give vent to the exhaust-steam when such steam is not for any reason so condensed or confined.

Referring to the drawing, A represents the curved outer shell of the valve, which has the two circular openings A' and A$^2$ opposite each other, the shell A having the flanges A$^3$ at these places suitable for connection with pipes leading to and from the valve.

B is a circular top piece secured to the shell A with an air-tight connection by the cap-screws B' and recessed at B$^2$. The bottom piece C, which is circular and recessed, is in like manner secured to the shell A by screws C'. Integral with the bottom piece C is the hollow cylindrical part C$^2$, having two series of ports C$^3$ and C$^4$ and near its joining with bottom piece C. The body of the valve as thus formed is divided into two chambers, one opening to the atmosphere through aperture A$^2$ and the other, normally a vacuum-chamber, connected with the condenser by aperture A'. This separation into chambers is made by the curved division-wall D, which is preferably integral with the shell A, and by disk E. The wall D in its horizontal part has a circular aperture around which are the flanges D', supporting the flanges D$^2$ of an annular strip of metal or other material D$^3$, which serves as a seat for the valve-disk E. The disk E has a circular groove E' on the under side near its circumference to receive the annular seat D$^3$. In this groove is the circular strip E$^2$, preferably of Babbitt metal. The disk E carries on its under side at intervals about the inner circumference of groove E' the radial guide-wings E$^3$, and between such wings are apertures for bolts F, to be described later.

Within the hollow cylindrical part C$^2$ of the bottom piece C is the disk G, recessed and having the projecting part G' on its under side, the upper surface being recessed at its circumference to receive the packing-rings G$^2$, secured to the disk G by screws G$^3$, and its perimeter recessed for the snap-rings or other suitable packing G$^4$, the disk G when at its lowest position in such cylindrical part making a tight connection with the wall thereof, and thereby closing ports C$^4$. The disk G has screw-threaded apertures registering with the apertures in the disk E, and the two disks are rigidly held together by bolts F and nuts F', so that when disk E rests upon the seat D$^3$ and closes the vacuum-chamber the disk G is in position to close the port C$^4$, and conversely when disk E is raised to open the vacuum-chamber the ports C$^4$ are open as well.

The bottom piece C has a threaded aperture at its center to receive the end of the hollow cylindrical sleeve H, which has an inner thread to engage the threaded stem H', which is operated by hand-wheel H$^2$. The end of the stem H' can be made to contact with the projection G' on the disk G and lift such disk, so that the valve may be repaired or access be had to the inner part of the vacuum-chamber. This device plays no part in the automatic operation of the valve.

As it is well known that a connection such as that made by disk G with the circular wall C$^2$ cannot be rendered air-tight when there is a vacuum created on one side of it, it will be obvious that the recess or chamber between bottom piece C and disk G will also be a vacuum-chamber when the condenser is in operation, the connections with parts H and H' and around the aperture in bottom piece C, to be referred to hereinafter, being understood to be air-tight connections. Into this vacuum-chamber through the aperture last referred to extends the vertical pipe J, connected by a suitable elbow J' with horizontal pipe J², which has across it the wall K, with a circular aperture which is closed from below by the valve K', having the stem K². In the pipe J² below the valve is an opening for the plug J³ and above the valve a vertical pipe connection J⁴, which leads to a chamber formed by the disks J⁵, suitably flanged and secured together. Across this chamber is the diaphragm K³, held by an air-tight connection between the flanges of the disks J⁵, and to this diaphragm is secured the end of the valve-stem K². A pipe connection J⁶ leads from the part of the chamber above the diaphragm through the bottom piece C into the vacuum-chamber made by wall D and disks E and G at a place outside of the cylindrical part C². Pipe J², beyond the valve, is connected by a suitable elbow J⁷ with a vertical pipe J⁸, which enters the body of the valve on the atmosphere side through an aperture in the shell A.

Through a suitable opening in the recessed part B² of the top piece B extends the rock-shaft L, (shown by dotted lines in the drawing,) on one end of which is rigidly secured the lever-arm L', having notches at regular intervals to retain in position the weight L². On the rock-shaft L, within the recessed part B², is the arm L³, the shaft being preferably squared at this point. Pivoted in one end to the end of the arm L³ and at the other end to the projection E⁴ on the disk E is the arm L⁴, the function of the parts just described being to transmit the pressure of the adjustable weight L² to the disk E.

I have now described with some particularity the different parts of my device; but it will be clear that there may be a considerable variation from the precise constructions shown without departing from the spirit of my invention, and therefore I do not limit myself to the particular devices and constructions herein shown.

The device whereby the equalizing or counterbalancing pressure is applied to one side of the valve device responsive to variations in the pressure of the low-pressure chamber may be greatly varied, its essential feature being capacity to transmit at the proper time counterbalancing pressure to the proper side of the valve device.

The use and operation of my valve are as follows: As has been shown, when the condenser of the engine is operating in the usual and proper manner a vacuum will be formed in the chamber made by wall D and disk E, the disk resting on the seat D³ and making an air-tight connection therewith. The weight L², which has been set when the engine was begun to be operated, exerts a downward pressure on the disk E according to the adjustment, such a pressure being that which it is intended that the exhaust-steam will have to overcome in order to find vent by the automatic operation of the valve. The vacuum thus created will cause a vacuum in the chamber between bottom piece C and disk E, it being impossible, as has been said, to make a perfectly tight connection between the parts of this chamber. This vacuum will extend through pipe J⁶ and on one side of diaphragm K³. The other side of the diaphragm, however, is acted upon by the pressure of the atmosphere through the pipe J⁸, and consequently the diaphragm will be pressed upward and valve K' held to its seat. If now for any reason the condenser ceases working, the steam will pass into the chamber under disk E and exert a pressure tending to raise disk E against the weight of the atmosphere. As the steam or other fluid will not pass so readily into the lower vacuum-chamber between C and G as it was drawn therefrom, (as is well known in constructions of this sort,) the steam would be obliged to exert a very considerable upward pressure before the disks could be lifted—that is, a pressure in excess of atmospheric pressure. To obviate this, I have provided the pipe connection J J² J⁸, leading from the lower vacuum-chamber to the atmosphere, and its accompanying valve and diaphragm. When the steam enters the upper vacuum-chamber, it passes down through pipe J⁶ and exerts a downward pressure upon diaphragm K³, unseating valve K', thereby allowing the air to pass into the chamber below disk G, so as to approximately equalize the pressure below disk G and above disk E. Therefore when the steam has sufficient head to lift the disks against the weight L², which has been adjusted as desired, it can escape from under disk E into the outer chamber. The ports C⁴ when opened by the lifting of disk G afford an additional escape for steam and water. Thus when the device has introduced the counterbalancing pressure into the chamber it may not effect a perfect counterbalancing, and hence under some conditions it may be necessary or desirable to introduce the pressure from the low-pressure chamber, which is by escape through the valve introduced to the chamber from which J⁸ opens directly, and this is effected by means of the valve-opening C⁴ and, if the motion is contained, C³.

I have used the term "vacuum-chamber;" but for the purposes of the claims I shall use the more general term "low-pressure chamber." It will also be understood that the connection at A³ may be made with any device so that there may be the atmospheric or other pressure in the chamber or at the mouth of the pipe J⁸. It will also be understood that the particular structure for transmitting the pressure from the mouth of the pipe J⁸ to the chamber beneath the disk G may be of any desired character. It will also be understood that the presence of water or other fluids in any part of the device will not necessarily affect its operation, as the pressures required can be transmitted through any kind of fluids.

I claim—

1. An automatic relief-valve for engines having a normally low-pressure chamber communicating with the exhaust-passage of the engine, a passage-way with a higher pressure, a valve-opening between such chamber and passage-way, a valve device movable at a predetermined increase of pressure in the low-pressure chamber to allow the escape of fluid through the valve-aperture, a second chamber to permit a pressure to be exerted upon the valve device counterbalancing the pressure from the passage-way thereupon, and means actuated by the increase of pressure in the first low-pressure chamber for effecting such counterbalancing pressure in the second chamber.

2. An automatic relief-valve for engines having a low-pressure chamber communicating with the exhaust-passage of the engine, a valve-opening therein communicating with the atmosphere, a movable valve device to permit the escape of fluid at predetermined pressure from the low-pressure chamber, an air-chamber adapted to effect a pressure on the valve device counterbalancing the pressure of the atmosphere at the valve-opening, and a device actuated by the pressure of fluid in the low-pressure chamber for admitting air-pressure to such air-chamber.

3. An automatic relief-valve for engines having a low-pressure chamber communicating with the exhaust-passage of the engine, a valve-opening therein, a movable valve device to permit the escape of fluid through the valve-opening, such device comprising two rigidly-connected disks, a hollow cylindrical member in the low-pressure chamber adapted to receive one disk of the valve device so as to form a second chamber, means actuated by the increased pressure of fluid in the low-pressure chamber for admitting a counterbalancing pressure into such second chamber.

4. An automatic relief-valve for engines having a normally low-pressure chamber communicating with the exhaust-passage of the engine, a passage-way with a higher pressure, a valve-opening between such chamber and passage-way, a valve device movable at a predetermined increase of pressure in the chamber to allow the escape of fluid through the valve-aperture, a second chamber to permit a pressure to be exerted upon the valve device counterbalancing the pressure from the passage-way thereupon, means actuated by the increase of pressure in the first low-pressure chamber for effecting such counterbalancing pressure in the second chamber, and means for directly connecting the low-pressure chamber with the second chamber after the valve device has moved a certain distance.

5. An automatic relief-valve for engines having a low-pressure chamber communicating with the exhaust-passage of the engine, a valve-opening therein communicating with the atmosphere, a movable valve device to permit the escape of fluid at predetermined pressure from the low-pressure chamber, an air-chamber adapted to effect a pressure on the valve device counterbalancing the pressure of the atmosphere at the valve-opening, a device actuated by the pressure of fluid in the low-pressure chamber for admitting air-pressure to such air-chamber, and means for directly connecting the low-pressure chamber with the second chamber after the valve has moved a certain distance.

6. An automatic relief-valve for engines having a low-pressure chamber communicating with the exhaust-passage of the engine, a valve-opening therein, a movable valve device to permit the escape of fluid through the valve-opening, such device comprising two rigidly-connected disks, a hollow cylindrical member in the low-pressure chamber adapted to receive one disk of the valve device so as to form a second chamber, means actuated by the increased pressure of fluid in the lower-pressure chamber for admitting a counterbalancing pressure into such second chamber, and means for directly connecting the low-pressure chamber with the second chamber after the valve has moved a certain distance.

7. An automatic relief-valve for engines comprising a low-pressure chamber communicating with the exhaust-passage of the engine, a valve-opening therein, a movable valve device to close or open such valve under varying conditions of pressure, an air-chamber adapted to effect a pressure on the movable valve device counterbalancing the pressure thereon at the valve-opening, means actuated by increase of pressure of fluid in the low-pressure chamber for admitting air to such air-chamber, and adjustable means for predetermining the amount of fluid-pressure required to operate such valve device.

8. An automatic relief-valve for engines comprising a low-pressure chamber communicating with the exhaust-passage of the engine, a valve-opening therein, a movable valve device to close or open such valve, under varying conditions of pressure, an air-chamber adapted to effect a pressure on the movable valve device counterbalancing the pressure thereon at the valve-opening, means actuated by increase of pressure of fluid in the low-pressure chamber for admitting air to such air-chamber, and adjustable means for predetermining the amount of fluid-pressure required to operate such valve device, and a device for manually moving such valve device from its seat.

9. An automatic relief-valve for engines having a low-pressure chamber communicating with the exhaust-passage of the engine, a valve-opening therein communicating with the atmosphere, and a valve-seat associated therewith, a movable device to permit the escape of fluid at predetermined pressure from the low-pressure chamber, such valve device comprising two disks with a rigid connection between them, one of the disks being adapted to engage with the valve-seat, and having radial guide-wings thereon, an air-chamber adapted to effect a pressure upon the other disk of the valve device counterbalancing the pressure of the atmosphere at the valve-opening, and a device actuated by the pressure of fluid in the low-pressure chamber for admitting air or water to such air-chamber.

10. An automatic relief-valve for engines having a vacuum-chamber communicating with the exhaust-passage of the engine, a valve-opening therein communicating with the atmosphere, a movable valve device to permit the escape of fluid at predetermined pressure from the vacuum-chamber, an air-chamber adapted to effect a pressure on the valve device counterbalancing the pressure of the atmosphere thereon at the valve-opening, and a device actuated by pressure of fluid in the vacuum-chamber for admitting air to such air-chamber, such device comprising an inlet-pipe having a valve controlling the supply of the air therethrough to the air-chamber, a diaphragm-chamber with a diaphragm thereacross associated with such valve, and a pipe connection from the vacuum-chamber and leading to the diaphragm-chamber on the side of the diaphragm opposite from the valve.

11. An automatic relief-valve for engines having a normally low-pressure chamber communicating with the exhaust-passage of the engine, a passage-way with a higher pressure, a valve-opening between such chamber and passage-way, a valve device movable at a predetermined increase of pressure in the chamber to allow the escape of fluid through the valve-aperture, a second chamber to permit a pressure to be exerted upon the valve device counterbalancing the pressure from the passage-way thereupon, and means responsive to variations in the pressure of the low-pressure chamber adapted to introduce from some other source a counterbalancing pressure in the said second chamber.

12. An automatic relief-valve for engines comprising a valve-chamber with a valve device therein normally closed by superior pressure on one side thereof and adapted to be opened by increased pressure on the low-pressure side, and means actuated by variations in the pressure on the low-pressure side and adapted to introduce an increasing pressure on that side, so that the total pressure on the low-pressure side exceeds the pressure on the high-pressure side.

13. An automatic relief-valve for engines comprising a valve-chamber with a valve device therein normally closed by superior pressure on one side thereof and adapted to be opened by increased pressure on the low-pressure side, and means responsive to variations in the pressure on the low-pressure side and adapted to introduce increased pressure from a source other than the low-pressure side of the valve, so that the total pressure on the low-pressure side exceeds the pressure on the high-pressure side.

14. A relief-valve comprising a valve-case, a seat, and a valve proper, with a superior pressure to seat the valve on one side and an inferior pressure from the chamber to be relieved on the other side, means responsive to variations in the pressure on the low-pressure side and adapted to apply increased pressure thereto to counterbalance the superior pressure.

GEORGE C. DAVIS.

Witnesses:
HOMER L. KRAFT,
ANSON B. SWEET.